United States Patent [19]

Sublette et al.

[11] Patent Number: 4,804,453

[45] Date of Patent: Feb. 14, 1989

[54] RESOLUTION OF EMULSIONS WITH MULTIPLE ELECTRIC FIELDS

[75] Inventors: Kerry L. Sublette, Tulsa; Floyd L. Prestridge, Sapulpa, both of Okla.

[73] Assignee: National Tank Company, Tulsa, Okla.

[21] Appl. No.: 385,349

[22] Filed: Jun. 7, 1982

[51] Int. Cl.$^4$ .................. C10G 33/02; B01D 17/06
[52] U.S. Cl. ................................. 204/302; 204/188
[58] Field of Search ........ 204/186, 188, 149, 302–308, 204/294

[56] References Cited

U.S. PATENT DOCUMENTS 3,645,880  2/1972  Ueda ................................. 204/278
3,649,516  3/1972  Cole, Jr. et al. ..................... 204/302
3,661,746  5/1972  Lucas .................................. 204/188
4,118,294  10/1978 Pellegri ............................... 204/129
4,133,738  1/1979  Will .................................... 204/294

Primary Examiner—John F. Niebling
Assistant Examiner—William T. Leader
Attorney, Agent, or Firm—Richard H. Berneike

[57] ABSTRACT

A pair of electrodes in the configuration of parallel plates represents how multiple pathways are formed through which emulsions of relative polar and relative non-polar liquids are passed. The electrode plates are comprised of materials which render the plates varying in electrical conductivity to establish multiple electric fields which degrade in the direction of emulsion flow.

1 Claim, 3 Drawing Sheets

RESOLUTION OF EMULSIONS WITH MULTIPLE ELECTRIC FIELDS

TECHNICAL FIELD

The present invention relates to the composition and construction of electrically charged electrodes to form passageways within which a mixture of relatively polar and relatively non-polar liquids passes through a plurality of electric fields of varying intensity. More particularly, the invention relates to establishing a series of electric fields of varying intensity by utilizing materials for the electrode construction which vary in conductivity in the direction of flow of liquid mixtures between the electrodes.

BACKGROUND ART

There is an omnipresent need in the oil industry for rapid, high-volume liquid/liquid separation in which one of the liquid phases is conventional crude oil or "syncrude" produced from tar sands or oil shale and the other is water or brine. Oil and water are, of course, immiscible, however, an aqueous phase is frequently present in produced oil as a highly dispersed, discontinuous phase. The mixture is referred to as an emulsion. The source of this aqueous phse is formation water and/or condensed steam used in secondary and tertiary recovery.

The removal of entrained or emulsified water from oil is a long-standing problem, as evidenced by the following patents and publications: U.S. Pat. Nos. Prestridge, 3,772,180, 1973; 3,847,775, 1974: 4,116,790, 1978; 4,308,127, 1981; Waterman, L. C., *Chem. Eng. Progress*, 61 (10), 51–57 (1965); Sjoblom, G. L. and Goren, S. L., *I&EC Fund.*, 5 (4), 519–525 (1966). One of the more widely used methods of performing this separation utilizes high voltage electric fields. Two mechanisms apparently operate to bring about coalescence of droplets of relatively polar water or brine in a non-polar medium, such as oil, with the force of an electric field. Firstly, the water droplets may acquire a net charge by direct contact with a charging electrode or through convective transfer of charge from the electrode by the oil. An attractive force will exist between water droplets which have acquired opposite charges. These attractive forces promote coalescence of the droplets. Secondly, water droplets in an electric field will become polarized by alignment of the polar water molecules with the external field and through the redistribution of mobile cations and anions within the water droplet. Attractive electrostatic forces between oppositely charged regions of neighboring water droplets promote their coalescence. The relative importance of these two mechanisms is evidently determined by the physical and chemical properties of the two phases. Of particular importance is the electrical conductivity of the oil. The mechanism of electrically enhanced coalescence has been discussed extensively in scientific literature. Refer to Pearce, C. A. R., *Brit. J. of Appl. Phys.*, 5, 136–143 (1954); Allan, R. S. and Mason, S. G., *Trans. Far. Soc.*, 57, 2027–2040 (1961); Pohl, H. A., *J. Appl. Phys.*, 22 (7), 869–871 (1951); Bailes, P. J. and Larkai, S. K. L., *Trans. I. Chem. E.*, 59, 229–237 (1981); Sadek, S. E. and Hendricks, C. D., *I&EC Fund.*, 13, 139–142 (1974).

The background art in electrically enhanced coalescence is replete with the many variations for effective application of electric fields to the resolution of mixtures of polar liquids dispersed in non-polar liquids. One variation which is especially pertinent to the present invention is that of the degrading electric field. This concept forms the basis of U.S. Pat. No. 4,126,537 (1978), F. L. Prestridge and U.S. Pat. 4,308,127 (1981), Prestridge and Longwell. In the embodiment of electrically enhanced coalescence described in these disclosures, the voltage gradient between fixed electrodes is decreased in the direction of fluid flow by gradually widening the distance between the electrodes. The configuration of the electrode system is such that the emulsion to be treated is first exposed to a high electric field strength created by closely spaced electrodes, then exposed to progressively lower electric field strengths as the distance between the electrodes is increased. The importance of the degrading field concept, as represented by the foregoing disclosures, lies in the fact that the use of degrading electric fields is a significant step forward in circumventing the inherent limitations of prior art electric treating systems. This importance will become apparent from the discussion which follows.

At a given electric field strength, the magnitude of attractive forces between neighboring polarized or charged droplets of polar liquid in a non-polar, relatively nonconductive continuous liquid phase are dependent, in part, upon droplet radius. The smaller the droplet radii, the weaker will be the attractive forces which promote coalescence. Droplet radii further influence coalescence efficiency by affecting collision frequency. Droplets of polar liquid which carry a net charge will move in an electric field toward an oppositely charged electrode. At a given field strength and droplet charge, droplet velocity decreases with droplet radii. Reduced droplet velocity and small droplet radii combine to give reduced collision frequencies. Since the attractive force between oppositely charged droplets increases with decreasing distance between them, a decrease in collision, or encounter frequency, has a negative influence of coalescence efficiency. Refer to: Sadek, S. E. and Hendricks, C. D., I & EC Fund., 13, 139–142 (1974).

The attractive forces between polarized and charged droplets of polar liquid in a non-polar continuous phase, as well as the velocities of charged droplets, increase with increasing electric field strength to which the droplets are exposed. Therefore, it is not surprising that prior art has shown that very high field strengths are required to affect the coalescence of very small droplets of dispersed polar phase. However, at any given field strength there are certain limitations with respect to the maximum droplet size which may be achieved. Consider for the purpose of analysis, an emulsion of water in oil. The first of these limitations concerns the hydrodynamic forces to which water droplets are exposed in an electric field. The net charge acquired by water droplets results in motion of these droplets in the area between two charged electrodes, or between a charged electrode and ground. Superimposed on this motion are electroconvective currents generated in the continuous oil phase. These movements subject the water droplets to hydrodynamic forces which may cause individual droplets to disperse. The magnitude of hydrodynamic force required to disperse a water droplet is dependent, in part, upon droplet radius. The smaller the droplet radius, the greater the hydrodynamic force required to disperse the droplet.

The second of these limitations concerns electrical stresses on water droplets. Charged droplets have a tendency to disperse when a critical gradient is produced at the droplet surface. The magnitude of the critical dispersing gradient is inversely proportional to the square root of the droplet radius. Therefore, the larger the charged droplet the lower the electrical gradient at the droplet surface which will cause droplet dispersal. Excessive charge gradients at the droplet surface may be established through conductive or convective charging of the droplet, or through polarization of the droplet. Both hydrodynamic and electrical stresses then tend to establish a maximum water droplet size in the electric field. This maximum size will be determined by the physical properties of the two liquid phases and the strength and homogeneity of the electric field. The limitations of electrical coalescing systems have been discussed in scientific literature. Refer to: Sadek, S. E. and Hendricks, C. D., *I&EC Fund.*, 13, 139-142 (1974); Waterman, L. C., *Chem. Eng. Prog.*, 61 (10), 51-57 (1965); Doyle, A., Moffett, D. R., Vonnegut, B., *J. Colloid Sci.*, 19, 136-143 (1964).

An emulsion of water or brine in crude oil will normally contain a distribution of aqueous phase droplet sizes. In oil field emulsions, for example, distributions in water droplet diameters of from 2-100 microns or more are not uncommon. In some emulsions the volume fraction of entrained water contained in the smallest droplets in the distribution can be significant enough to require their removal in order to produce a sufficiently dry oil. Coalescence of these very small water droplets requires high electric field strengths. However, as discussed previously, these high electric field strengths will limit the maximum droplet size achievable in the field. If water droplets of this limited size are of an insufficient size as to allow their gravitation from the oil, then little will be gained by their coalescence. In addition, any droplets of the original dispersion with dimensions greater than the maximum droplet size for the treating field strength will be dispersed. Prior to the appearance of the degraded field concept, most electric treaters used electric fields which allowed the production of water droplets which were sufficiently large to allow their gravitation from the oil, but were of insufficient strength to allow appreciable coalescence of the smallest droplets of the emulsion. In a degraded field created by widening the distance between charged electrodes in the direction of flow, the emulsion is first exposed to a high gradient zone which allows coalescence of the very small droplets. The product of this zone is then passed into a second zone which possesses a lower electrical gradient. The electric field in this second zone is of sufficient strength to promote coalescence of water droplets received from the first zone. However, the electric field in the second zone being weaker than that of the first zone allows an increase in the maximum droplet size which may exist in the field. Therefore, as the emulsion is passed progressively through electric fields of decreasing strength, the dispersed droplets grow in size until they are large enough to gravitate from the oil. The improvements over prior art offered by this type of degrading field are then, (1) more efficient coalescence of the very small droplets of typical water-in-oil emulsions, and (2) the creation of larger, more effectively gravitating water droplets in the treated mixture.

The embodiment of the degraded field concept described above offered significant improvement over prior art in electric treatment of organic continuous emulsions. However, it is not a panacea. Although the electric field strength decreases in the direction of flow, the charge on the electrodes remains relatively constant over its entire area. Therefore, mechanisms exist in low field strength areas for significant charging of water droplets by conductive or convective charge transfer and the subsequent dispersal of the droplet. Under the influence of electrical stresses, the droplet dispersal mechanism is such that the daughter droplets produced are much smaller than the original droplet. When these daughter droplets are produced in a low field strength area, there is little opportunity for their recoalescence. This problem is further compounded by the fact that critical dispersal gradients may be created in droplets near the electrodes in the exit region of the electric field through polarization of droplets. Strong polarization of the droplets can result from exposure to the locally strong inhomogeneous divergent electric fields at the electrode edges.

In addition to these basic limitations, the prior art also has the problem of both physically spacing plate electrodes to generate degrading electric fields, and a rather severe mechanical problem of suspension of these electrodes. The electrodes, in the form of metallic sheets, are heavy, making them difficult to support within a vessel. It is desirable that the composition of these electrodes be fabricated to reduce the weight and render it unnecessary for physical spatial divergence in the direction of flow of the liquid mixture through their passages.

DISCLOSURE OF THE INVENTION

The present invention contemplates spaced, charged electrodes comprised of materials which vary in electrical conductivity in the direction of flow of a mixture of polar and nonpolar liquids between the electrodes and generate electric fields varying in intensity in the direction of flow of the mixture.

The invention further contemplates passing an emulsion of a relatively polar liquid phase dispersed in a relatively nonpolar continuous liquid phase through a system of plates which are mounted parallel to each other and to the direction of fluid flow. The electrodes are constructed of an electrically conductive section or sections and an electrically nonconductive or insulating section or sections in intimate physical contact. The conductive and nonconductive sections are associated in such a way that an emulsion, in its flow between the two parallel plates, will pass through a zone bounded by nonconductive material after passing through a zone bounded by conductive material.

The invention further contemplates the electrical characteristics of electrodes constructed of an electrically conductive plastic or fiberglass with decreasing electrical conductivity in one dimension. The electrical resistance in each plate increases in the direction of flow in such a way that an emulsion, in its flow between the parallel electrodes, will be bounded by increasingly less electrically conductive material as it flows.

The invention further contemplates that conductive regions of electrode plates shall be energized in such a way that the conducting regions of adjacent plates will be charged with opposite polarity or alternating plates will be charged while the remaining plates are grounded.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Terms and Technology

A conventional form and arrangement of electrodes in the shape of plates means that the plates are vertically suspended, parallel to each other, and provide a passageway between each pair in which an emulsion of polar and non-polar liquids flows through an electric field between the electrodes. In the prior art, these plates are conventionally metallic, suspended within a vessel from insulators, and are connected to a source of electrical energy to develop the electric field between them.

The plate electrodes in the preferred embodiment of the present invention generate a multiplicity of electric fields in the passageway between the electrodes, one of which decreases in intensity in the direction of flow of the liquid mixture. Presently, there are visualized at least two constructions of the electrode plates which will make it unnecessary to physically diverge each pair of electrode plates from each other to decrease the intensity of the electric field in the direction of fluid flow.

The broadest concept of the present invention is not limited to embodiment in vertically suspended, flat plate electrodes, although this may be the presently preferred embodiment. The basic thrust of the concept is that charged electrodes are spaced from each other and the electric fields sustained between the electrodes have a variation in intensity along the line of flow of liquid emulsion in the space between the electrodes, dependent upon the change in electrical conductivity of the electrode material. Each electrode may be formed with a section or sections of conductive material in intimate contact with a section or sections of nonconductive material, or an electrode material may be provided which will vary more or less continuously in electrical conductivity along the line of flow. However, the broad concept of the invention includes both of these alternate electrode constructions.

Figure 1:
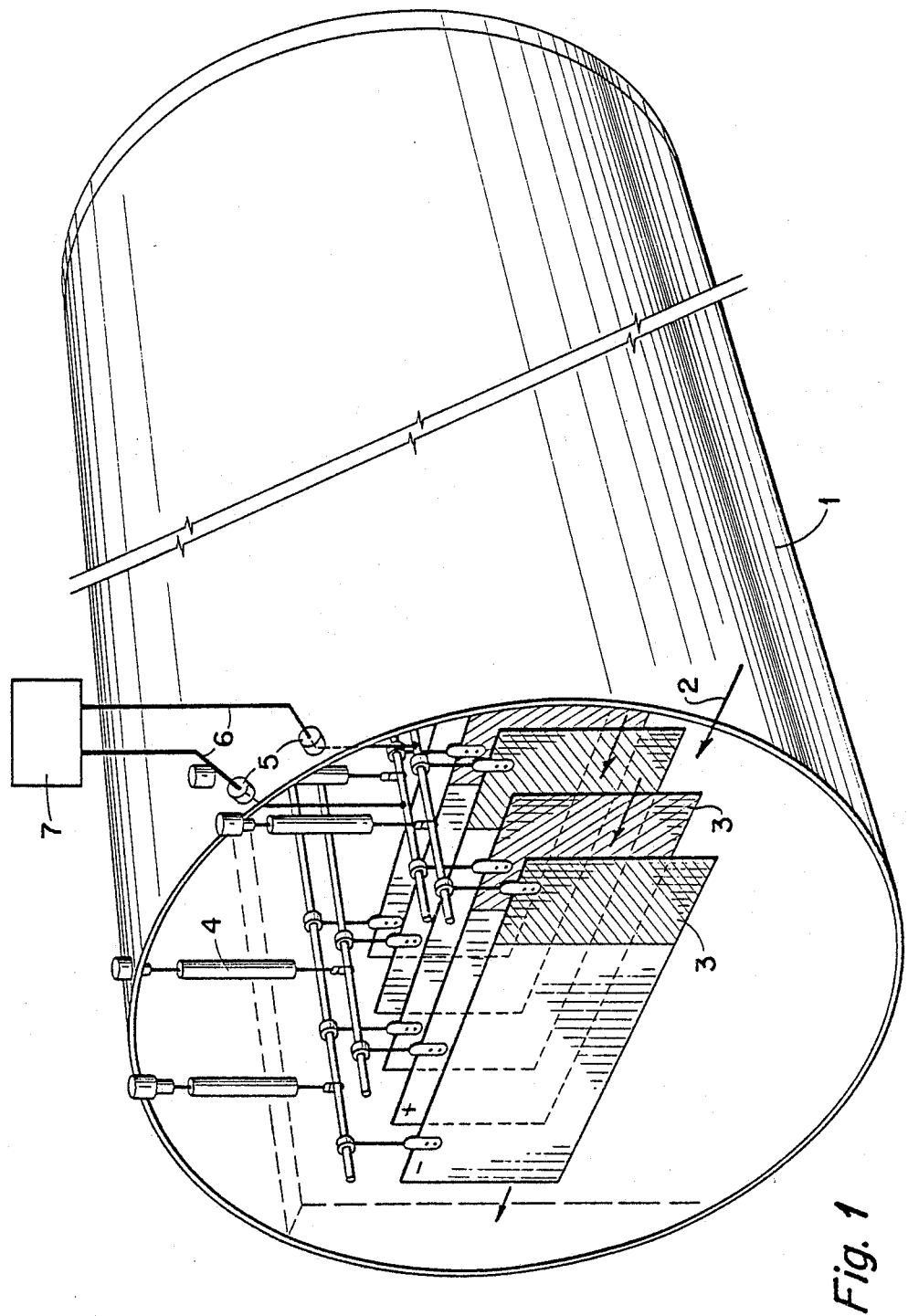
FIG. 1 is a sectioned perspective of a horizontally elongated vessel containing vertically suspended parallel plate electrodes and embodying the present invention.

FIG. 1—The General Environment

FIG. 1 is presented to disclose enough of the shell 1 to understand that it forms an elongated, horizontal vessel. In accordance with convention, it is customary to flow oil well production into one end of shell 1, separate the production into its components and discharge these components separately as they have been collected within shell 1. As always, structure within shell 1 is arranged to provide the forces of separation upon the oil well production flowing through shell 1.

It is somewhat awkward to disclose in detail the reception of oil well production within the end of shell 1 as disclosed in FIG. 1. An arrow 2 serves to indicate the connection of shell 1 to an oil well so that the liquids and gas from the oil well flow into the side of the shell near its front end. It is assumed that any gas has been removed from this production. The present invention is embodied in structure which separates an emulsion of oil and water and these liquids will enter shell 1 through the inlet represented by arrow 2. After their separation, the oil and water are collected in the upper and lower portions of shell 1 and are discharged separately by conduits which need not be illustrated in FIG. 1.

The immediate fact represented by FIG. 1 is that the mixture of liquids inserted into shell 1 flow through the parallel passageways formed between pairs of plate electrodes 3 which are vertically suspended and extend transverse the longitudinal axis of shell 1. The support for these plate electrodes 3 is elaborately depicted. Insulated hangers 4 extend from a set of racks which make up a grid structure in the upper portion of shell 1. If the plate electrodes are formed of metal, as is presently conventional, these insulated hangers 4 must be designed to bear the load imposed by the weight of these plate electrodes. The art is replete with the problems of providing hangers which are able to withstand their vertical loads and simultaneously provide electrical insulation for the plates.

To complete the overall illustration of necessary environmental components, insulating bushings 5 are represented as penetrating the wall of shell 1. Through these bushings 5 are transformer connections 6 which extend from transformer 7 to the plate electrodes 3. The result is the establishment of electric fields between pairs of electrodes 3 through which the emulsion of oil and water passes and separates.

Figure 2:
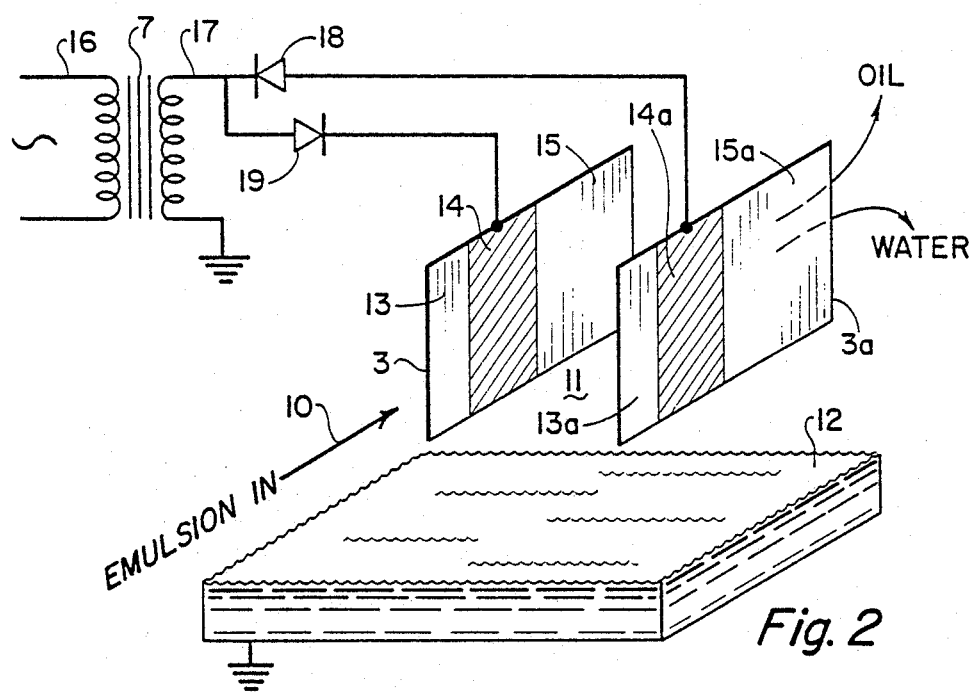
FIG. 2 is a perspective view of a pair of plate electrodes of FIG. 1 forming a passageway for the emulsion between them.
Figure 3:
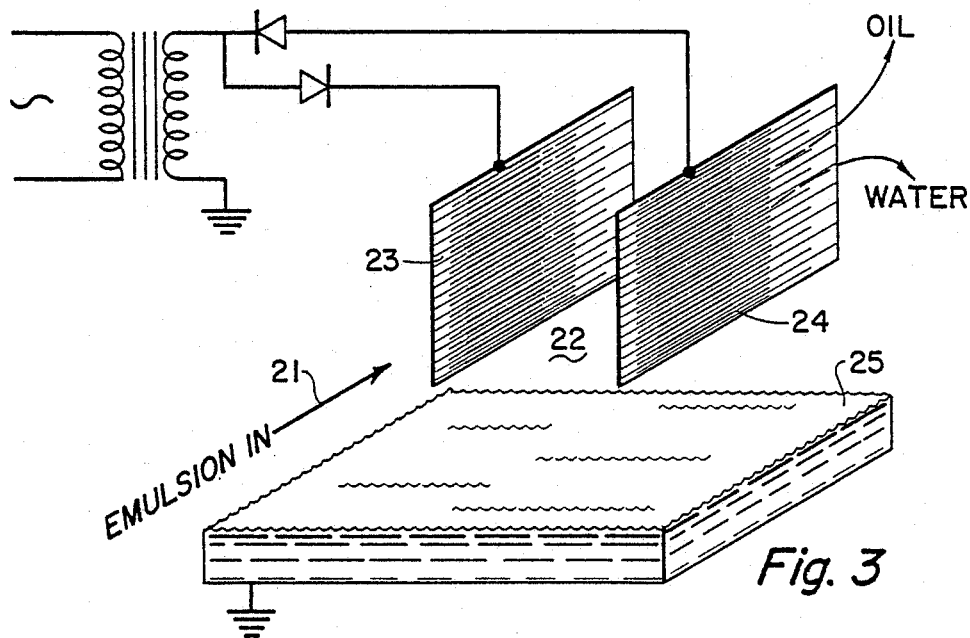
FIG. 3 is a perspective view similar to FIG. 2 wherein the pair of plates are of an alternate construction.
Figure 4:
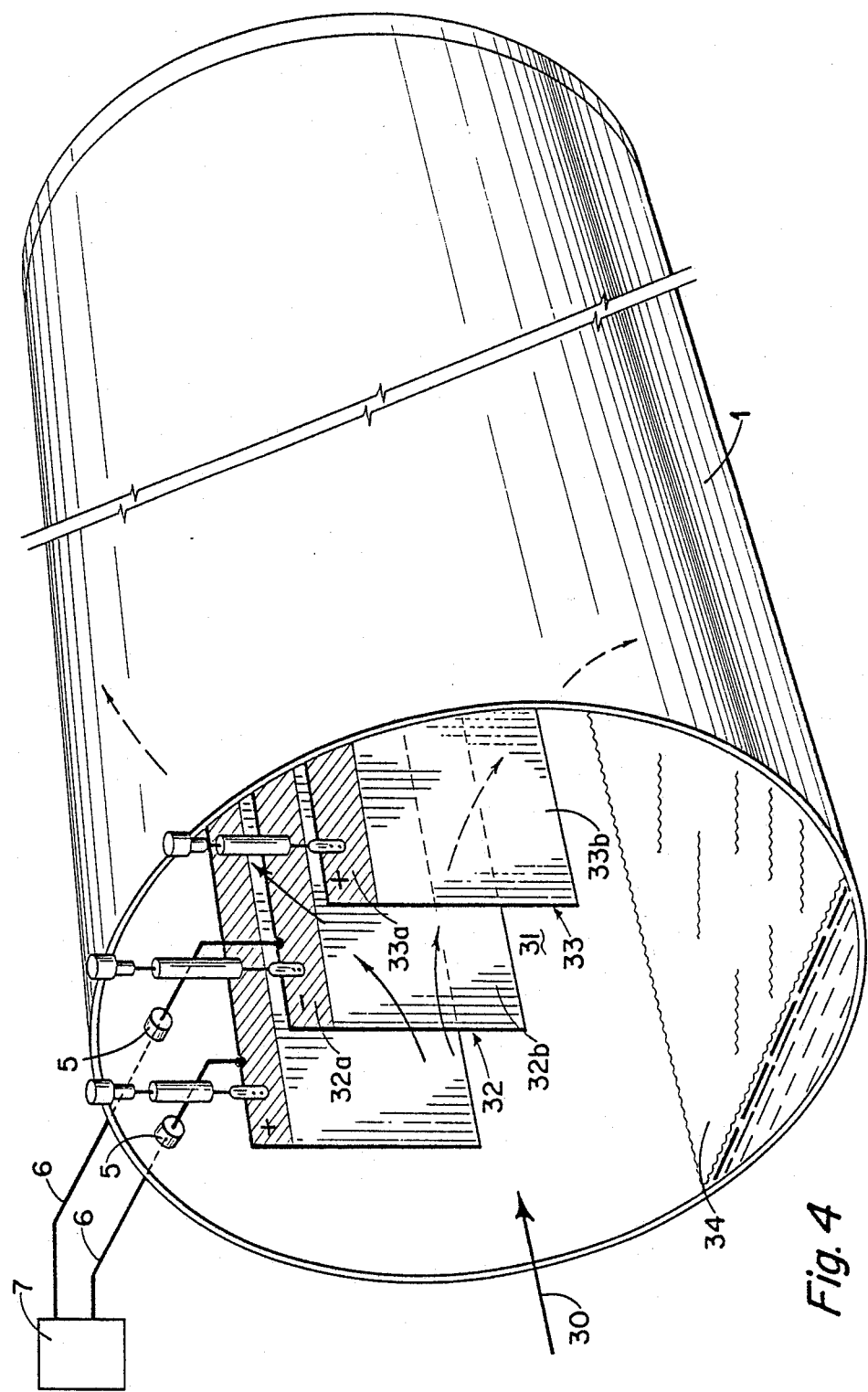
FIG. 4 is a sectioned perspective similar to FIG. 1 with the electrodes extended longitudinally within their vessel.

FIGS. 2, 3 and 4 represent the form of plate electrodes embodying the present invention. In each figure only a pair of electrodes 3 are disclosed in relation to the flow of fluids into shell 1, the coalesced collection of water below the electrodes, and the remaining collection of oil above the electrodes. FIG. 1, then, sets the initial environment of shell, electrical source, and suspension system of the plate electrodes which are the essential element embodying the invention.

FIG. 2—Conductive and Nonconductive Sections

General

FIG. 2 discloses a pair of electrode plates constructed with separate conductive and nonconductive sections between which plates the degrading field is achieved by virtue of the insulating properties of the nonconductive section. Edge to edge contact of these nonconductive sections with the conductive sections establishes a surface charge of the same polarity on the insulating material of the nonconductive sections as that applied to the conductive sections. The charging of an insulating material is not well understood. However, the rate of transfer of charge along the surface of the insulator is related to the charge relaxation time constant of the material defined by the following equation: $\iota = \epsilon/\sigma$ where $\iota =$ charge relaxation time constant, $\epsilon =$ the permittivity and $\sigma =$ the conductivity of the material. The greater is the charge relaxation time constant, the slower should be the transfer of charge along the surface. Under operating conditions, the surface charge on the insulating material is not uniform over the entire surface area. While the nonconductive section has as its source of charge the line of contact with the conductive section, a gradient in surface charge will exist with decreasing charge density with increasing distance from the line of contact with the conductive section. The precise characteristics of this gradient will be dependent upon the charge relaxation time constant of the nonconductive material, the conductivity of the non-polar continuous phase, and the volume fraction of the dispersed polar phase. An increase in either of these latter parameters increases loss of charge from the insulating material and increases the rate of change in charge density with increasing distance from the conductive section. In certain applications, it may be desirable to ensure that the potential on the nonconductive section drops to zero in the direction of flow. This can be accomplished by grounding that end of the nonconductive section furthest removed from the contact with the conductive section.

Specific

FIG. 2 discloses only one pair of electrode plates 3 embodying the present invention. Although not shown in FIG. 2, the electrode plates are suspended from hangers 4, as illustrated in FIG. 1, within the shell 1 through which the mixture of liquids to be treated is flowed. Arrow 10 represents the direction of flow of the liquid mixture to be treated. As indicated, the flow of the mixture is to be considered as it enters passageway 11 formed by parallel electrode plates 3 and 3a. As the relatively polar liquids of the mixture coalesce and gravitate downward in the passageway 11, a collection 12 is formed below the plates. The invention is illustrated by the construction and arrangement of the electrode plates 3 and 3a.

In the direction of fluid flow, each electrode is composed of an electrically nonconductive section 13, 13a, followed by a conductive section 14, 14a, and another nonconductive section 15, 15a. In the area between the electrodes bounded by the nonconductive sections 13, 13a, the emulsion experiences an increasingly strong electric field in the direction of flow. In that area bounded by the conductive sections 14, 14a, the emulsion is exposed to a homogeneous electric field of constant field strength. The strongest electric field strength to which the emulsion will be exposed while flowing between the electrode plates is in this zone formed between 14, 14a. In the zone or area bounded by the nonconductive sections 15, 15a, the emulsion experiences a degrading electric field in the direction of flow. Therefore, as an emulsion flows between adjacent electrode plates it experiences three distinctly different treatment zones. The first zone acts as a pretreatment area where coalescence of large droplets of the dispersed polar phase may be enhanced. Pretreatment of an emulsion at a low electric field strength is desirable for two reasons. First, removal of the larger droplets of the dispersed phase prior to flowing through a high electric field strength zone reduces dispersal of these droplets through electrical and hydrodynamic stresses and, therefore, the need for their recoalescence. In other words, such pretreatment simply limits the counterproductive dispersal of droplets. Secondly, when an emulsion contains a high volume fraction of dispersed polar phase, immediate exposure to a high electric field strength can result in the formation of conductive paths (dielectric breakdown) with a resulting loss of electric field strength. Preliminary treatment at a low electric field strength reduces the volume fraction of dispersed polar phase and reduces the incidence of dielectric breakdown in the high field strength zones.

The second treating zone to which the emulsion is exposed is the homogeneous electric field of constant field strength between the conductive regions 14, 14a of adjacent plates. In this zone the emulsion may be exposed to the high electric field strength required to coalesce the smallest droplets of dispersed polar phase in the emulsion. The third zone, that is located between the nonconductive sections 15, 15a, receives the product of the high electric field strength area and exposes the emulion to progressively weaker electric fields until droplets of the dispersed phase have grown sufficiently large to gravitate from the mixture. However, since the degrading electric field is created by degrading the charge density on the electrode plate, electrical and hydrodynamic stresses are minimized in the low electric field strength regions where the largest droplets of dispersed polar phase will exist.

The characteristics of the electric fields generated in the three treating zones are dependent upon a number of design factors. These include, (1) the relative dimensions and placement of the conductive and nonconductive sections of each electrode plate; (2) the potential applied to the conductive section; (3) the characteristics of the applied potential; (4) the spacing between electrode plates; and (5) the charging characteristics of the nonconductive or insulating section. This latter parameter will influence the characteristics of the charge gradients established on the nonconductive sections in the direction of flow and therefore the nature of the degrading electric field. It would, of course, be undesirable that the surface charge established on the insulating material extend merely a short distance from the point of contact with the conductor. It is preferable that there be a gradual decline in surface charge in the direction of flow in the degrading field area. Ordinary fiberglass has been shown to be an acceptable insulating material in certain applications. Selection of other suitable nonconductive materials may be made in view of consideration already discussed.

The electrical circuitry in the embodiment illustrated in FIG. 2 includes a transformer 7, also illustrated in FIG. 1, with a primary 16 connected to a source not shown, and a secondary 17 connected on one side to ground and on the other side to the conductive sections of each electrode plate. The connection of the secondary to the electrode includes two rectifiers 18 and 19 in parallel. Each rectifier is connected to one-half of the electrodes in the system in such a way that every other plate is connected to the same rectifier. Connected in this way, every adjacent pair of conductors on the electrode plates is oppositely charged. Alternatively, the rectifiers may be eliminated from the circuit and one side of the secondary connected to every other plate conductor in the system, while the other side of the secondary is grounded and connected to the remaining plates. Connected in this way, in every adjacent pair of electrode plates in the system, one plate is charged with alternating current while the other plate is grounded.

FIG. 3—Plastic Electrode Plates

General

In an electrode system utilizing plates composed of conductive plastic or fiberglass, the degrading electric field is achieved predominately by virtue of a decrease in electrical conductivity in the plastic or fiberglass in the direction of flow. A variety of electrically conductive plastics and fiberglasses have been developed which derive their conductivity from incorporation of metal-coated glass fibers, metal fibers, carbon fibers, and special carbon blacks. A gradient in electrical resistance in any given dimension may therefore be created in a plastic or fiberglass plate by fabricating the plastic in such a way as to produce a gradient in the concentration of the conductive filler in that dimension. Refer to: Wehrenberg, R. H., *Materials Eng.* 95 (3), 37–43 (1982); Anonymous, *Battelle Today,* #8, p.7 (1978). The precise characteristics of a degrading electric field created between electrodes of degrading electrical conductivity in the direction of flow will be most strongly influenced by the nature of the conductivity gradient in the electrodes. However, those factors which influence the charging characteristics of a nonconductive or insulating material under operating conditions will also be important design and operating considerations. These factors have been discussed previously.

Specific

An illustrative embodiment of an electrical treating system utilizing electrodes constructed of conductive plastics is given in FIG. 3. The configuration of the embodiment disclosed by FIG. 3 is identical with that of FIG. 2 except in the construction of the plates. As in FIG. 2, a vessel in which the electrodes are mounted is assumed to be as that in FIG. 1. Arrow 21 indicates the direction of the flow of the mixture of liquids to be treated. The flow of liquids is through a passageway 22 formed between electrodes 23 and 24. The body 25 of coalesced liquids is gravitated below the plate electrodes. Separate withdrawal of the liquids from body 25, and the remaining liquids of the mixture, is not specifically shown.

The electrical conductivity of the plates 23, 24 in FIG. 3 is represented by various degrees of shading. Those areas of the plates with the greatest conductivity are most heavily shaded. As the emulsion flows horizontally between the two electrode plates illustrated, it is first exposed to an electric field of increasing strength in that area bounded by the front sections of the electrodes where conductivity is increasing in the direction of flow. This is a pretreatment area similar in function to that described in the embodiment of FIG. 2 between electrode sections 13, 13a. As illustrated in FIG. 3, the emulsion next experiences a homogeneous electric field of constant field strength in that zone bounded by the highly conductive sections of the electrode plates. This zone provides the high electric field strength required to coalesce the smallest droplets of dispersed polar phase in the emulsion. Upon exiting the constant homogeneous field in this zone, the emulsion experiences a degraded electric field as it passes through that zone bounded by those areas of the electrode plates where conductivity decreases in the direction of flow. The emulsion is therefore exposed to progressively weaker electric fields until droplets of the dispersed phase have grown sufficiently large to gravitate from the mixture and join body 25. However, once again, the degrading electric field is created by degrading the charge density on the electrode plates in the direction of flow. Therefore, electrical and hydrodynamic stresses are minimized in the low electric field strength regions where the largest droplets of the dispersed phase will exist.

The design parameters discussed in connection with the embodiment illustrated in FIG. 2 are also pertinent to the embodiment of FIG. 3. However, as discussed above, there is the additional parameter of choice of conductive filler and concentration gradients of the filler in the electrode plates. The electrical circuitry external to the electrode plates in the embodiment illustrated by FIG. 3 is identical to that described for the embodiment illustrated by FIG. 2 and need not be duplicated.

Those embodiments of the creation of degrading electric fields through the degrading of electrode charge density in the direction of flow described above, are illustrative only and are not meant to restrict the present invention to only those choices of design parameters employed in those embodiments.

FIG. 4

A second illustrative embodiment of an electrical treating system utilizing electrodes constructed of separate conductive and nonconductive sections is disclosed in FIG. 4. The configuration of the embodiment disclosed by FIG. 4 is identical with that of FIG. 2 except in the physical arrangement of the conductive and nonconductive sections of the plates. As in FIGS. 2 and 3, a vessel in which the electrodes are mounted is assumed to be as that in FIG. 1. Arrow 30 indicates the direction of the flow of the mixture of liquids to be treated. The flow of liquids is through a passageway 31 formed between electrodes 32 and 33. The body 34 of coalesced water is gravitated below the plate electrodes. Arrangements for separate withdrawal of the water from body 34, and the remaining liquids of the mixture, is not specifically shown.

As stated above, the plates 32, 33 in FIG. 4 are each constructed with an electrically conductive section and an electrically nonconductive section, comparable to the sections of the plates in FIG. 2. However, the conductive and nonconductive sections are oriented in a radically different organization in FIG. 4. Electrically conductive section 32a comprises the top portion of electrode plate 32. The lower section 32b comprises the lower portion of plate 32. The two sections, then, have an edge-to-edge contact parallel to the horizontal. Plate electrode 33 is constructed with two sections precisely as plate electrode 32. Thus, the most intense electric field between electrodes 32, 33 is in the upper portion of the passageway 31, while the lower portion of the passageway contains an electric field which, under normal operating conditions, degrades downwardly from the edge-to-edge contact line.

Arrow 30 represents the point of entry into passageway 31 for the emulsion to be separated. In carrying out the concept of this species of the invention, the entry of the emulsion is expected to be somewhat below the edge-to-edge contact of the two portions of the plates. Water droplets of varying sizes are in the emulsion. The lighter portions of the emulsion, the oil, will begin to gravitate upward, sweeping the smaller sized water droplets with the oil. The larger sized water droplets will tend to gravitate downward toward the body 34. The degraded field between the lower portions of the electrodes promote the growth of the larger water droplets by coalescence as they gravitate downwardly to join body 34. The smaller water droplets in the more intense electric field will be grown by coalescence and descend into the degraded field where their growth will continue until all the water is collected into body 34. In the foregoing arrangement of horizontal flow represented by arrow 30, inserted, roughly, between the more intense field in the upper portion of passageway 31 and the degrading field in the lower portion of passageway 31, the diverging flows of oil and coalescing water will have a minimum of interference with each other.

In conclusion, two additional advantages of the present invention should be noted, again. First, electrode plates constructed in either fashion described in this disclosure will be lighter than conventional all-steel plates. Electrode grid systems must be suspended in a treating vessel from insulating hangers, generally made of Teflon, as represented by hangers 6 in FIG. 1. Less weight in the electrode grid system would reduce the incidence of mechanical failure of these relatively fragile hangers. Secondly, in those embodiments of the present invention in which the electric field degrades in the direction of the interface between the polar and non-polar phases, the electrodes may be designed in such a way that the electrodes will not be shorted out during a period of upset if the interface rises to the bottom of the grid system.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. An electrical system in which to generate electric fields in which the more polar liquids of a mixture coalesce, including, a source of electrical energy, a vessel elongated in a horizontal direction, means for conducting an emulsion of relatively polar liquid dispersed as droplets throughout a continuous phase of relatively non-polar liquid into a first end of the vessel, an insulating bushing in the wall of the vessel through which a conductor from the source of electrical energy is conducted to the interior of the vessel, insulator structures arranged within the vessel to vertically suspend electrodes within the vessel, at least one pair of plate electrodes in vertical parallel planes to form a passageway through which the emulsion flows horizontally and each electrode varying in conductivity in a horizontal direction, means for connecting the source of electrical energy to the electrodes to generate an electric field in their passageway which degrades in the direction of fluid flow in their passageway, means for collecting and withdrawing the coalesced polar liquid from the vessel, and means for separately withdrawing the remaining non-polar liquid from the vessel.

* * * * *